(No Model.)
F. A. SCHAETZKE.
GRATER.
No. 440,901. Patented Nov. 18, 1890.
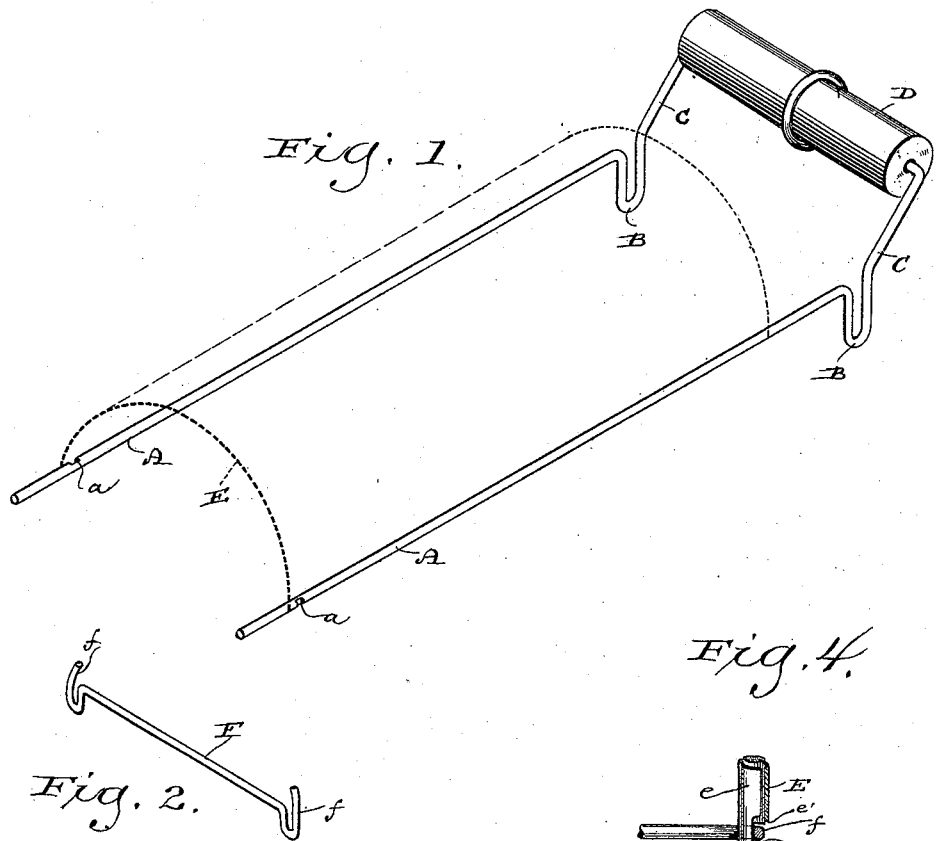
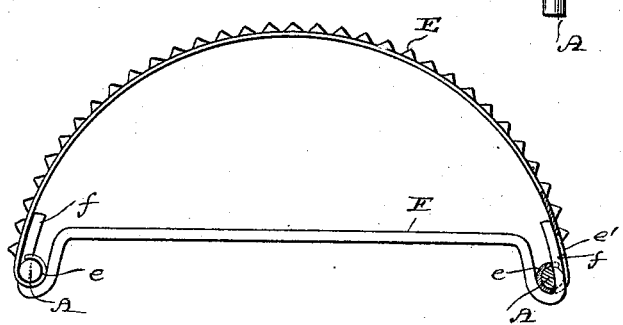
Witnesses
Geo. W. Young
Wm. Klug
Inventor
Ferdinand A. Schaetzke
By H. G. Underwood
Attorney

UNITED STATES PATENT OFFICE.

FERDINAND A. SCHAETZKE, OF MILWAUKEE, WISCONSIN.

GRATER.

SPECIFICATION forming part of Letters Patent No. 440,901, dated November 18, 1890.

Application filed August 7, 1890. Serial No. 361,350. (No model.)

*To all whom it may concern:*

Be it known that I, FERDINAND A. SCHAETZKE, of Milwaukee, in the county of Milwaukee, and in the State of Wisconsin, have invented certain new and useful Improvements in Graters; and I do hereby declare that the following is a full, clear, and exact description thereof.

My invention relates to appliances for grating nutmegs, lemon-rinds, cocoanut-pulp, and such other commodities as are to be used for flavoring or for food in comminuted form; and my invention consists in certain peculiar and novel features of construction and arrangement, as hereinafter described, and pointed out in the appended claims.

In the drawings, Figure 1 is a perspective view of a grater embodying my invention, the grater proper being indicated in dotted lines. Fig. 2 is a detached perspective view of the removable fastener for the detachable grating device. Fig. 3 is an end elevation of the grater. Fig. 4 is a detached plan view, partly in section and partly broken away, of the connection between the grater-frame, the grating device, and the holder for uniting said parts.

The object of my invention is to produce holding appliances for graters which shall securely retain the grating device in proper operative position and yet permit the grating device to be easily detached when worn out, and also to accommodate various lengths of grating devices without necessitating any material alterations in the structure and arrangement of the holding appliances. These results I accomplish by virtue of the construction which I will now proceed to describe.

Referring to the drawings, A A designate two arms or bars which extend parallel with each other and each of which is formed at one end with a U-shaped bend B, which extends at right angles to the bars A. From the bends B extend arms C, the outer ends of which are turned inwardly to receive a handle D. Near their outer ends the bars A are formed on their outer sides with recesses or notches *a a*, for a purpose to be presently explained.

E designates the grating device. This device is shown as of semi-cylindrical form, and its longitudinal edges are shown at *e* as bent inward to embrace the bars A.

F designates a wire fastening, the opposite ends of which are bent into U form, as shown at *f*, to embrace the bars A, and the outer arms of these bends *f* enter slots *e'* in the grater E, thus removably confining the grater to the bars A. It will be seen that graters E of varying lengths can be applied to the bars A, because the variations in length will be appreciable only at those parts of the bars A which are adjacent to the bends B, above described, and will not affect the action of the attaching device F.

I have shown the bars A, bends B, and arms C as formed of a single piece of wire; but it is obvious that the parts may be of wood or other material and each of a separate piece suitably joined to the others. The grater F is also shown as of semi-cylindrical form; but this is not essential to the spirit of my invention, as such grater may be of angular or flat form, as desired. The edges *e* of the grater may be bent outwardly, if preferred, instead of inwardly. Moreover, the bends B may be dispensed with, and instead projections may be located at the upper end of the grater, extending at right angles to the bars A and away from the grater—that is to say, that when the structure is held horizontally with the grater uppermost, then upon whatever part the projections may be formed they will extend substantially vertically downward from the grater, so as to act as stops to rest against the rim or edge of the dish into which the grated commodity is deposited, or to raise the grater up, as from a table.

The ends of the grater may be or may not be wired without departing from the essential spirit of my invention.

Having thus described my invention, what I claim as new therein, and desire to secure by Letters Patent, is—

1. An improvement in graters, consisting of side pieces provided with sockets or recesses adjacent to their outer ends, in combination with a holder having bent ends to engage said sockets and removably retain a grater thereon, substantially as set forth.

2. The combination, with the side pieces, the pendent bends thereof, and the sockets formed thereon, of a grater having its edges bent to embrace the side pieces, slots formed in the lower end of the grater, and a holder bent at its ends to embrace the said side pieces and enter the slots and sockets, and thus removably retain the grater upon the side pieces, substantially as set forth.

In testimony that I claim the foregoing I have hereunto set my hand, at Milwaukee, in the county of Milwaukee and State of Wisconsin, in the presence of two witnesses.

FERDINAND A. SCHAETZKE.

Witnesses:
H. G. UNDERWOOD,
LAWSON SCOTT.